June 7, 1949. J. H. ANDRESEN, JR., ET AL 2,472,507
POLYPHASE SUPPLY CIRCUIT
Filed Oct. 19, 1946

INVENTORS
John H. Andresen Jr
BY Edward Kasner
Myron J. Seibold
ATTORNEY

Patented June 7, 1949

2,472,507

UNITED STATES PATENT OFFICE 2,472,507

POLYPHASE SUPPLY CIRCUIT

John H. Andresen, Jr., Port Washington, and Edward Kasner, Brooklyn, N. Y., assignors to Square D Company, Detroit, Mich., a corporation of Michigan Application October 19, 1946, Serial No. 704,512

5 Claims. (Cl. 172—281)

1

This invention relates to an improved form of electronic circuit for producing a polyphase output from a single phase input and more particularly a two-phase output from a single phase input with the output frequency and sub-multiple of the input frequency.

The frequency meter herein described is described and claimed in a divisional application.

Other objects and features of the invention will be readily apparent to those skilled in the art from the specification and appended drawings illustrating certain preferred embodiments in which.

Figures 1, 2, 3, 4, 5, 6:
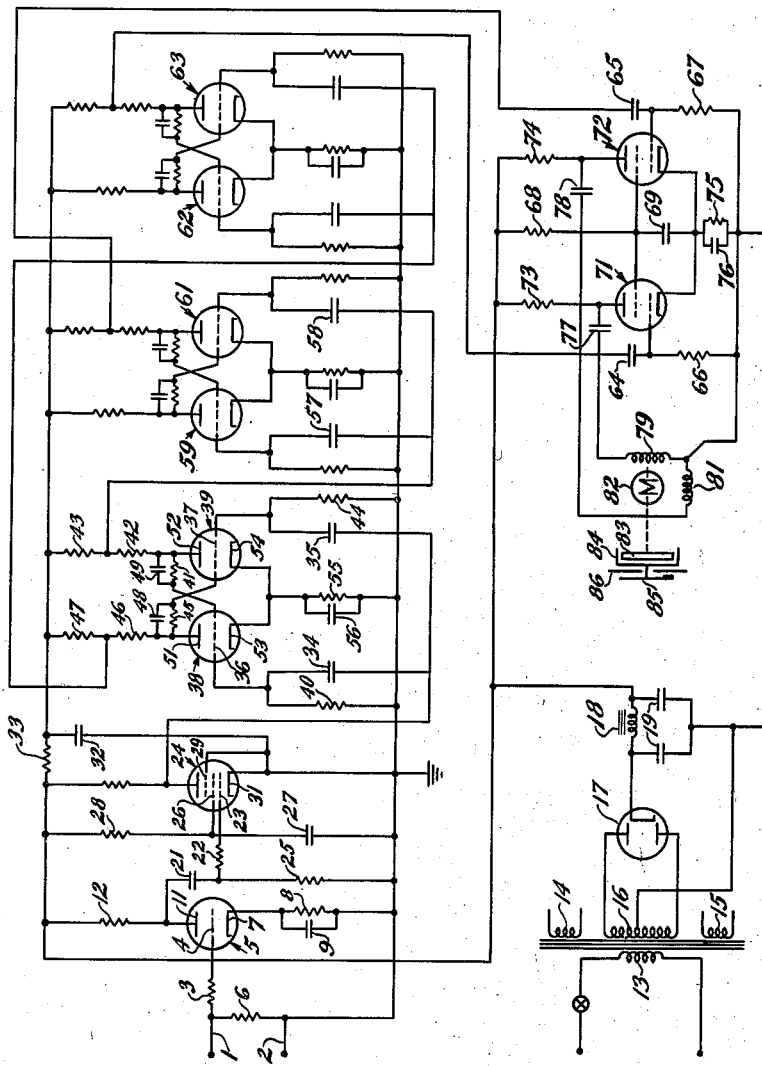
Figure 1 is a wiring diagram of an electronic circuit and frequency meter according to the present invention, in which the frequency of the single phase input is divided in the two phase output which feeds a synchronous motor driving a drag cup tachometer indicator.
Figures 2, 3, 4, 5 and 6 are representations of the wave form outputs of various tubes of the circuit of Figure 1.

In the diagram of Figure 1, the single phase input is applied at 1 and 2 and is fed through a protective resistor 3 to the control grid 4 of a voltage amplifying triode 5. The wire 2 is connected to ground and across 1 and 2 is provided a grid resistor 6. The cathode 7 of the triode 5 is connected to ground through cathode resistor 8 and by-pass condenser 9. The anode 11 of the triode 5 is connected to the supply through the load resistor 12.

The supply is provided from an alternating current source to the supply transformer primary 13 having secondary filament windings 14 and 15 and a main winding 16 supplying direct current through the rectifier tube 17 and the filter circuit represented by the inductance 18 and condensers 19.

The amplified output of the triode 5 is connected through a coupling condenser 21 and grid limiting resistor 22 to the control grid 23 of a pentode 24, the grid resistor being indicated at 25. The pentode 24 and its circuit serve as an amplifier-limiter which not only further amplifies the output of triode 5 but produces a square wave output. The pentode 24 has a screen grid 26 connected through by-pass condenser 27 to ground and through the voltage dropping resistor 28 to the supply. The suppressor grid 29 of the pentode 24 is connected to the cathode 31 and these are connected to ground and through a condenser 32 to the supply, the condenser 32 and resistor 33 constituting a decoupling filter to suppress alternating current on the dividers to be hereinafter described.

The output of the pentode 24 is fed through coupling condensers 34 and 35 to the grids 36 and 37 of triodes 38 and 39 forming part of an Eccles-Jordan frequency divider circuit. This circuit includes resistors 40, 41, 42, 43 and resistors 44, 45, 46, 47, which resistors form voltage dividing circuits which impress the grid bias on the tubes 38, 39. Condensers 48, 49 parallel the resistors 45 and 41. Anodes 51 and 52 of tubes 38 and 39 are connected to the supply through the resistors 46, 47 and 42, 43, respectively. The cathodes 53 and 54 are connected to ground through cathode resistor 55 and by-pass condenser 56.

The output of tube 39 is fed through coupling condensers 57 and 58 to the grids of tubes 59, 61 forming with their circuit connections a second Eccles-Jordan frequency divider circuit similar to that previously described in detail for the circuit embodying the tubes 38 and 39. Similarly, the output of tube 39 is fed to a third Eccles-Jordan circuit embodying the tubes 62 and 63. The outputs of tubes 61 and 63 are suitably amplified and fed to the frequency responsive meter.

The amplifying circuit is represented by the coupling condensers 64 and 65, grid resistors 66 and 67, screen grid resistor 68, screen grid by-pass 69, tetrodes 71 and 72, load resistors 73 and 74, cathode resistor 75 and cathode by-pass condenser 76. The amplified output of tubes 71 and 72 is fed through coupling condensers 77 and 78 to the two phase windings 79 and 81 of a synchronous motor 82 driving a permanent magnet 83 within a conducting drag cup 84 which carries a pointer 85 cooperating with a dial 86. The drag cup and its shaft are provided with a biasing spring, not shown, limiting its displacement.

In the operation of the electronic circuit and of the frequency meter of which it forms a part, the input frequency applied at 1 and 2 may have any wave form but the unknown frequency should be periodic. This single phase input is amplified by the tube 5 and the output fed to the amplifier-limiter tube 24 whose output is further amplified and is in the form of a rectangular wave as shown in Figure 2, regardless of the input wave form. The frequency of the output of tubes 38 and 39 is one-half that of the input frequency and is in the form illustrated in Figures 3 and 4, being 180° apart. This frequency division is a well known characteristic of the Eccles-Jordan circuit which tends to drive one tube toward cutoff and the other toward saturation. With the application of the square wave form input, sharp pulses are applied to the grids. When a positive pulse appears, the tube in the circuit momentarily conducting undergoes no change. The non-conducting tube attempts to conduct but is prevented from doing so by the negative bias impressed upon it by the other tube. When a negative pulse appears at the grids, both tubes are momentarily driven to cutoff. The charges existing on the condensers 48 and 49 now exert control of the circuit and the higher charge across the condenser at the initially conducting tube causes the initially non-conducting tube to conduct heavy and drive the initially conducting tube to cutoff. One input cycle causes one transfer of conduction to produce the one-half frequency output.

The Eccles-Jordan circuits formed by tubes 59, 61 and 62, 63 further divide the outputs of the tubes 38, 39. The outputs of tubes 59, 61 are 180° apart and the outputs of tubes 62 and 63 are 180° apart. However, the outputs of the tubes 61 and 63 are only 90° apart as is shown by the wave form of Figures 5 and 6, since the initial 180° out of phase relation of the wave forms of Figures 3 and 4 becomes 90° upon the frequency division. The output of tubes 61 and 63 is amplified in the circuit including the tubes 71 and 72 and feeds the two phase synchronous motor 82 which thus rotates at a synchronous speed of one-quarter the input frequency.

The magnetic drag cup tachometer has a direct reading dial indication corresponding to the speed of the motor 82. The permanent magent 83 is driven in synchronism with the motor 82 and sets up eddy currents in the drag cup motor 84 producing a shaft torque proportional to the speed of magnet rotation. This torque acting against a spring in known manner produces a displacement of the drag cup shaft proportional to the torque. The pointer 85 mounted on the shaft indicates on the dial 86 the input frequency, the dial 86 bearing indicia calibrated in cycles per second.

The circuit, according to the present invention, not only provides for a two phase output from a single phase input but subdivides the input frequency to any degree desired since any number of frequency dividers may be placed in advance of the divider circuit represented by the tubes 38, 39 to subdivide the frequency to any desired degree. Hence, the range of the frequency meter is independent of the physical limitations of the synchronous motor. Thus, a synchronous motor having an accurate frequency response over a range of 10 to 150 cycles per second may, by a frequency subdivision of four, be utilized to operate a frequency meter indicating from 40 to 600 cycles per second and with further division, the range can be further extended as desired. The use of the two phase synchronous motor is greatly preferred for its efficiency and good starting characteristics.

To secure the proper phase relation for continuous motor rotation in the same direction, it is desired that the firing order of the last dividers shall be consistent. Variation in the firing order of the dividers feeding thereto is immaterial since the reversal of both phases does not effect the direction of rotation. To secure the consistent order of firing in the last two dividers of the circuit, their plate load resistors are unbalanced so that the sections with the lower load resistances are always cut in first to insure consistency in the firing order and proper rotation of the motor at all times.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A circuit for producing a two phase output of subdivided frequency from a single phase input comprising a limiter circuit in which said input is changed to a single phase of the same frequency but of rectangular wave form, a frequency divider circuit fed by the single phase square wave form voltage and producing a pair of voltages of one-half the initial frequency displaced 180° in time phase relation, a second frequency divider to which one of said half frequency voltages is fed, a third frequency divider to which the other of said half frequency voltages is fed, said second and third frequency dividers each producing a pair of voltages of one-quarter the initial input frequency, and means for supplying one only of each of said second and third frequency divider outputs to produce a two phase voltage spaced 90° in time phase relation.

2. A circuit for supplying a two phase output from a single phase source comprising a first frequency divider circuit including a pair of electronic tubes fed from said input and having their output voltages of half the input frequency and spaced 180° in time phase, a second and third frequency divider each employing a pair of electronic tubes and fed from the outputs of the tubes of said first frequency divider, the outputs of the tubes of said second and third frequency divider having a frequency one-quarter that of the input voltage, and a circuit connected to the output to one of the tubes of each of said second and third frequency dividers to produce a two phase output in said last mentioned circuit having voltages spaced 90° in time phase relation.

3. A circuit for supplying a two phase output from a single phase source comprising a first frequency divider circuit including a pair of electronic tubes fed from said input and having their output voltages of half the input frequency and spaced 180° in time phase, a second and third frequency divider each employing a pair of electronic tubes and fed from the outputs of the tubes of said first frequency divider, the outputs of the tubes of said second and third frequency divider having a frequency one-quarter that of the input voltage, a circuit connected to the output to one of the tubes of each of said second and third frequency dividers to produce a two phase output in said last mentioned circuit having voltages spaced 90° in time phase relation, and means for insuring a consistent order of firing of the tubes in said second and third frequency divider to maintain the proper time phase relation in said two phase output.

4. A circuit for producing a two phase output of subdivided frequency from a single phase input comprising a first electronic tube fed from said input and having its output voltage of the same frequency as the input but of rectangular wave form, a first Eccles-Jordan frequency divider circuit fed by said rectangular wave form voltage and having its output two voltages of subdivided frequency spaced 180° in time phase, a pair of Eccles-Jordan frequency divider circuits each fed by one of the output voltages of said first Eccles-Jordan circuit and producing output voltages of further subdivided frequency, and a circuit fed by two only of the four outputs of said pair of Eccles-Jordan circuits to produce a two phase output of subdivided frequency spaced 90° in time phase relation.

5. A circuit for producing a two phase output of subdivided frequency from a single phase input comprising a first electronic tube fed from said input and having its output voltage of the same frequency as the input but of rectangular wave form, a first Eccles-Jordan frequency divider circuit fed by said rectangular wave form voltage and having its output two voltages of subdivided frequency 180° spaced in time phase, a pair of Eccles-Jordan frequency divider circuits each fed by one of the output voltages of said first Eccles-Jordan circuit and producing output voltages of further subdivided frequency and a circuit fed by two only of the four outputs of said pair of Eccles-Jordan circuits to produce a two phase output of subdivided frequency spaced 90° in time phase relation, the load resistors of said pair of Eccles-Jordan frequency divider circuits being unbalanced to insure consistent order of firing of the tubes therein.

JOHN H. ANDRESEN, JR.
EDWARD KASNER.

REFERENCES CITED

The following references are of record in the file of this patent:

UNITED STATES PATENTS

| Number | Name | Date |
|---|---|---|
| 1,029,007 | Frankenfield | June 11, 1912 |
| 1,614,202 | Lenehan | Jan. 11, 1927 |
| 1,848,866 | Baker | Mar. 8, 1932 |
| 2,333,502 | Wickham | Nov. 2, 1943 |